US012673259B2

(12) United States Patent
Katsikapes et al.

(10) Patent No.: US 12,673,259 B2
(45) Date of Patent: Jul. 7, 2026

(54) SYSTEMS AND METHODS FOR ENABLING AN AVATAR FROM AN APPLICATION TO VISIT ANOTHER APPLICATION

(71) Applicant: Verizon Patent and Licensing Inc., Basking Ridge, NJ (US)

(72) Inventors: Andrew Roger Katsikapes, Port Hadlock, WA (US); Zachary Drossman, New York, NY (US); Christian Guirnalda, Cranbury, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 322 days.

(21) Appl. No.: 18/496,366

(22) Filed: Oct. 27, 2023

(65) Prior Publication Data

US 2025/0135334 A1      May 1, 2025

(51) Int. Cl.
    *A63F 13/335*         (2014.01)
    *G06T 13/40*          (2011.01)
(52) U.S. Cl.
    CPC ............ *A63F 13/335* (2014.09); *G06T 13/40* (2013.01); *A63F 2300/5553* (2013.01)

(58) Field of Classification Search
None
See application file for complete search history.

(56) References Cited

U.S. PATENT DOCUMENTS

| | | | |
|---|---|---|---|
| 2011/0145341 A1* | 6/2011 | Hampel | H04L 67/131 |
| | | | 709/208 |
| 2018/0048756 A1* | 2/2018 | Tseng | H04M 1/72427 |
| 2024/0192838 A1* | 6/2024 | Palamadai | A63F 13/79 |

* cited by examiner

*Primary Examiner* — Ronald Laneau

(57) ABSTRACT

A device may authenticate a first application provided to a first client and a second application provided to a second client. The device may receive a communication initiated by the first client via the first application, and may provide the communication to the second application. The device may enable the communication to be answered by the second client via the second application, and may establish a data channel for the communication. The device may enable a request to grant access to the second application as an avatar to be provided to the second application, and may enable the request to be accepted by the second client via the second application. The device may enable the first application to provide avatar volumetric reconstruction data and an avatar position and rotation to the second application, and may enable the second application to provide foveated equirectangular data to the first application.

20 Claims, 7 Drawing Sheets

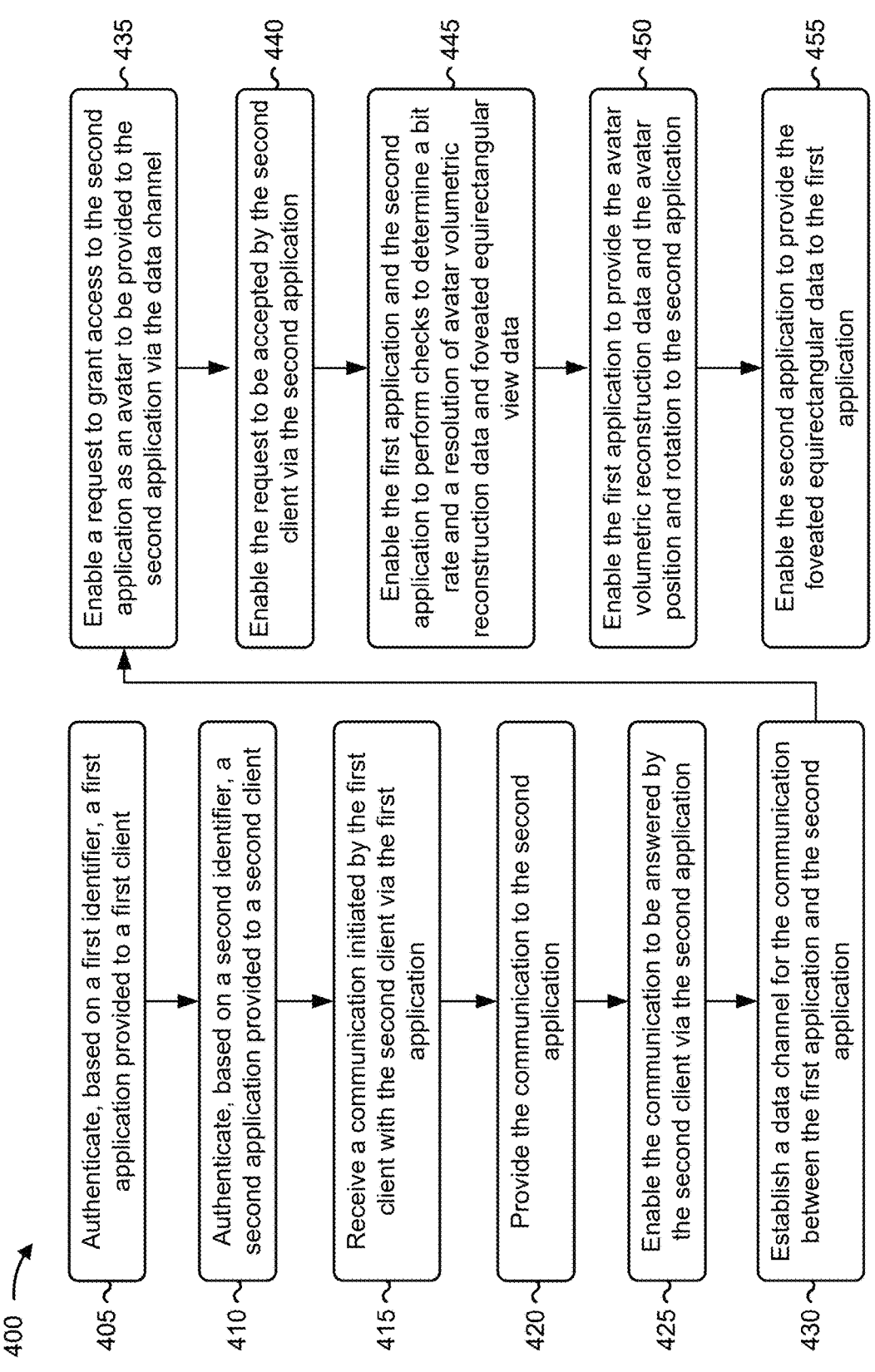

405 — Authenticate, based on a first identifier, a first application provided to a first client 410 — Authenticate, based on a second identifier, a second application provided to a second client 415 — Receive a communication initiated by the first client with the second client via the first application 420 — Provide the communication to the second application 425 — Enable the communication to be answered by the second client via the second application 430 — Establish a data channel for the communication between the first application and the second application 435 — Enable a request to grant access to the second application as an avatar to be provided to the second application via the data channel 440 — Enable the request to be accepted by the second client via the second application 445 — Enable the first application and the second application to perform checks to determine a bit rate and a resolution of avatar volumetric reconstruction data and foveated equirectangular view data 450 — Enable the first application to provide the avatar volumetric reconstruction data and the avatar position and rotation to the second application 455 — Enable the second application to provide the foveated equirectangular data to the first application

SYSTEMS AND METHODS FOR ENABLING AN AVATAR FROM AN APPLICATION TO VISIT ANOTHER APPLICATION

BACKGROUND

An avatar may be a graphical representation of a user, user's character, or a persona in an application, such as a video game application. An avatar may be a two-dimensional icon in Internet forums and other online communities. Alternatively, an avatar may take the form of a three-dimensional model, as used in online worlds and video games, or an imaginary character with no graphical appearance, as in text-based games or worlds.

BRIEF DESCRIPTION OF THE DRAWINGS

FIG. 4 is a flowchart of an example process for enabling an avatar from an application to visit another application.

DETAILED DESCRIPTION OF EXAMPLE EMBODIMENTS

Figure 1A:
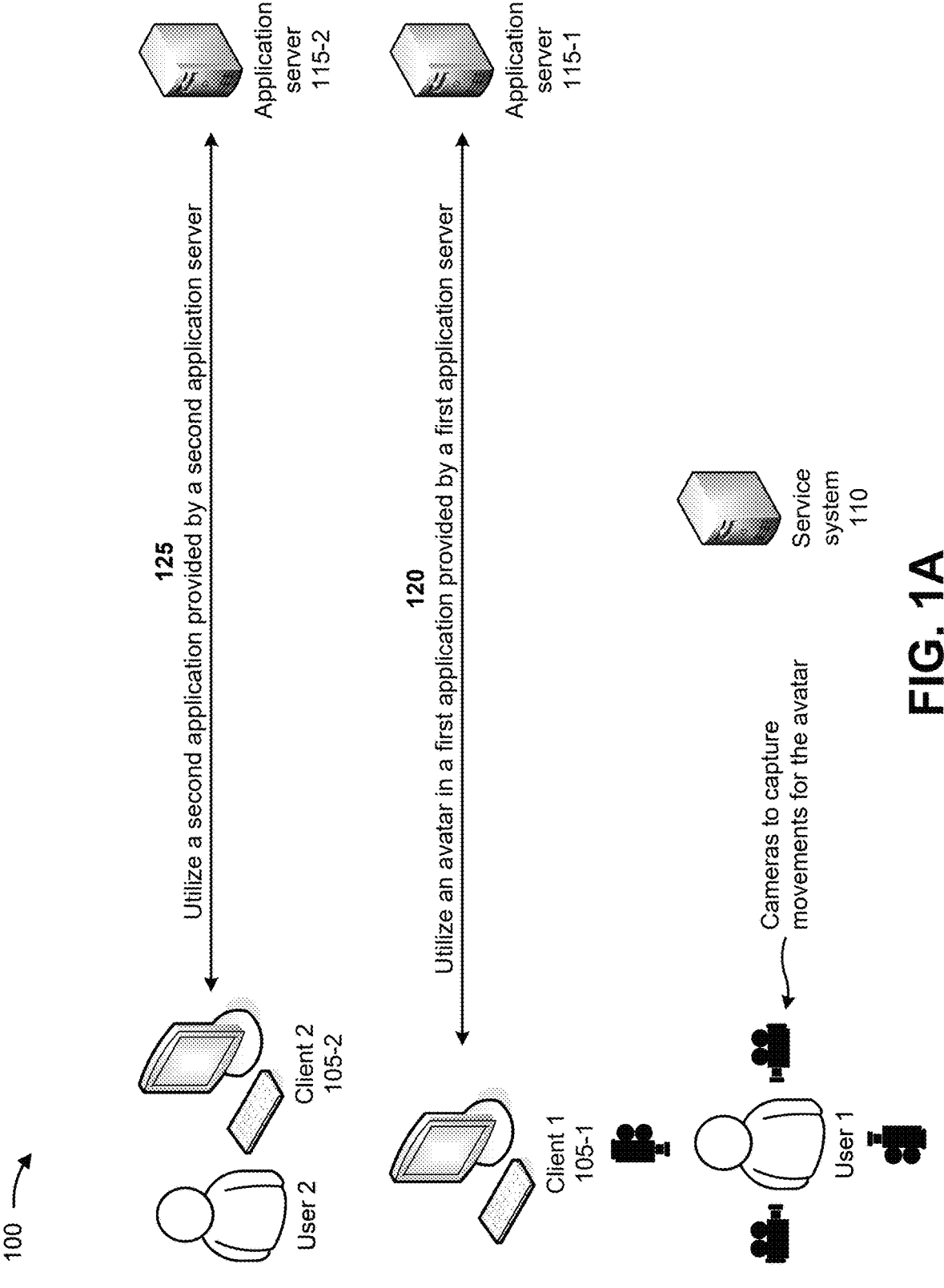
FIGS. 1A-1D are diagrams of an example associated with enabling an avatar from an application to visit another application.

The following detailed description of example implementations refers to the accompanying drawings. The same reference numbers in different drawings may identify the same or similar elements.

Currently, it is not possible to provide an avatar from one application to another application and still maintain features of the avatar. Rather, every client requires a specific animated character (avatar) that is represented in a specific application, as there is no standardized protocol to synchronize the same avatar in two different applications. Thus, current techniques for utilizing avatars consume computing resources (e.g., processing resources, memory resources, communication resources, and/or the like), networking resources, and/or other resources associated with failing to provide an avatar from one application to another application without losing features of the avatar, failing to synchronize the same avatar in two different applications, providing a poor user experience associated with a user of the avatar, and/or the like.

Some implementations described herein provide a service system that enables an avatar from one application to visit another application. The service system may authenticate, based on a first identifier, a first application provided to a first client, and may authenticate, based on a second identifier, a second application provided to a second client. The service system may receive a communication (e.g., a voice call, a video call, an instant message, and/or the like) initiated by the first client with the second client via the first application, and may provide the call to the second application. The service system may enable the communication to be handled by the second client via the second application, and may establish a data channel (e.g., for data associated with video, messaging, voice, an avatar, and/or the like) for the communication between the first application and the second application. The service system may enable a request to grant access to the second application as an avatar to be provided to the second application via the data channel, and may enable the request to be accepted by the second client via the second application. The service system may enable the first application and the second application to perform checks to determine a bit rate and a resolution of avatar volumetric reconstruction data and foveated equirectangular view data, and may enable the first application to provide the avatar volumetric reconstruction data and the avatar position and rotation to the second application. The service system may enable the second application to provide the foveated equirectangular data to the first application.

In this way, the service system enables an avatar from one application to visit another, different application. For example, the service system may enable a user-controlled avatar (or player character) of one application to visit another application experience. The service system may connect the two applications via a client identifier (e.g., a user's telephone number). The service system may enable two users in different applications to visit each other in their native avatar form. The service system may capture and render an avatar within another application and may not require specific avatar model formats by capturing the avatar's three-dimensional render, as opposed to capturing animation data then re-applying this data onto the same avatar in the other application. Thus, the service system may conserve computing resources, networking resources, and/or other resources that would have otherwise been consumed by failing to provide an avatar from one application to another application without losing features of the avatar, failing to synchronize the same avatar in two different applications, providing a poor user experience associated with a user of the avatar, and/or the like.

FIGS. 1A-1D are diagrams of an example 100 associated with enabling an avatar from one application to visit another application. As shown in FIGS. 1A-1D, example 100 includes multiple clients 105 associated with a service system 110 and multiple application servers 115. The multiple clients 105 may include a first client 105-1 associated with a first user (e.g., user 1) and a first application server 115-1, and a second client 105-2 associated with a second user (e.g., user 2) and a second application server 115-2. Further details of the clients 105, the service system 110, and the application servers 115 are provided elsewhere herein.

As shown in FIG. 1A, and by reference number 120, the first client 105-1 may utilize an avatar in a first application provided by the first application server 115-1. For example, the first application server 115-1 may provide the first application to the first client 105-1 and the first application may enable the first client 105-1 to utilize the avatar. The avatar may be rendered as a three-hundred and sixty degree point cloud based on movements captured by cameras (e.g., virtual cameras, real cameras, and/or the like) associated with the first application and/or the first client 105-1. In some implementations, the first client 105-1 may capture a communication (e.g., audio data, volumetric reconstruction data, positional and rotational data, messaging data, video data, video associated with body language, avatar data, video data for a head of the avatar, and/or the like) associated with the avatar, and may serialize and/or deserialize the audio data, the volumetric reconstruction data, and/or the positional and rotational data for transport via the service system 110 (e.g., a telephony Internet protocol (IP) network).

As further shown in FIG. 1A, and by reference number 125, the second client 105-2 may utilize a second application provided by the second application server 115-2. For example, the second application server 115-2 may provide the second application to the second client 105-2 and the second user of the second client 105-2 may utilize the second application. In some implementations, the second application may include a video game application, a virtual meeting application, a virtual reality application, an augmented reality application, and/or the like.

Figure 1B:
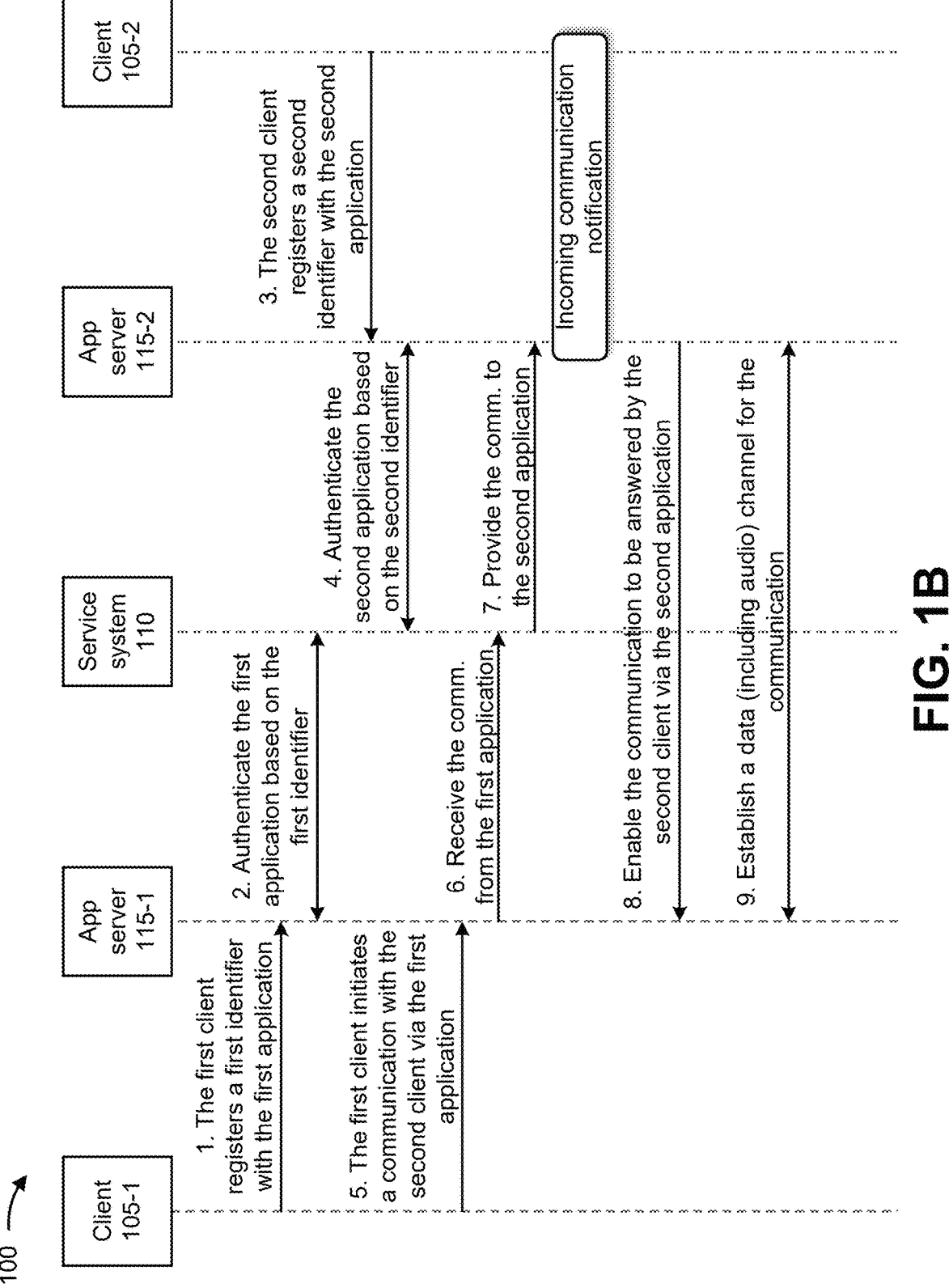
Figure 1C:
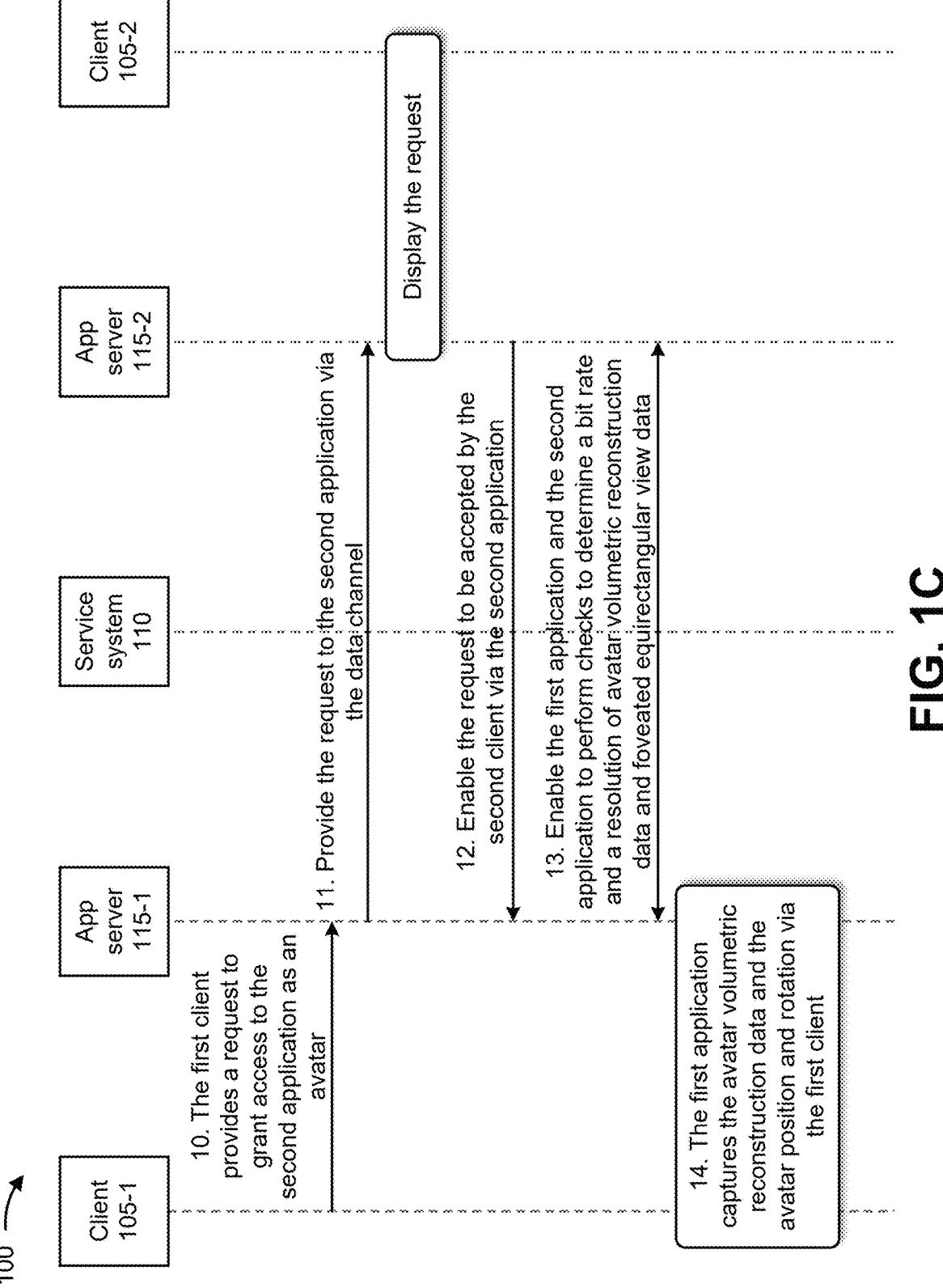
Figure 1D:
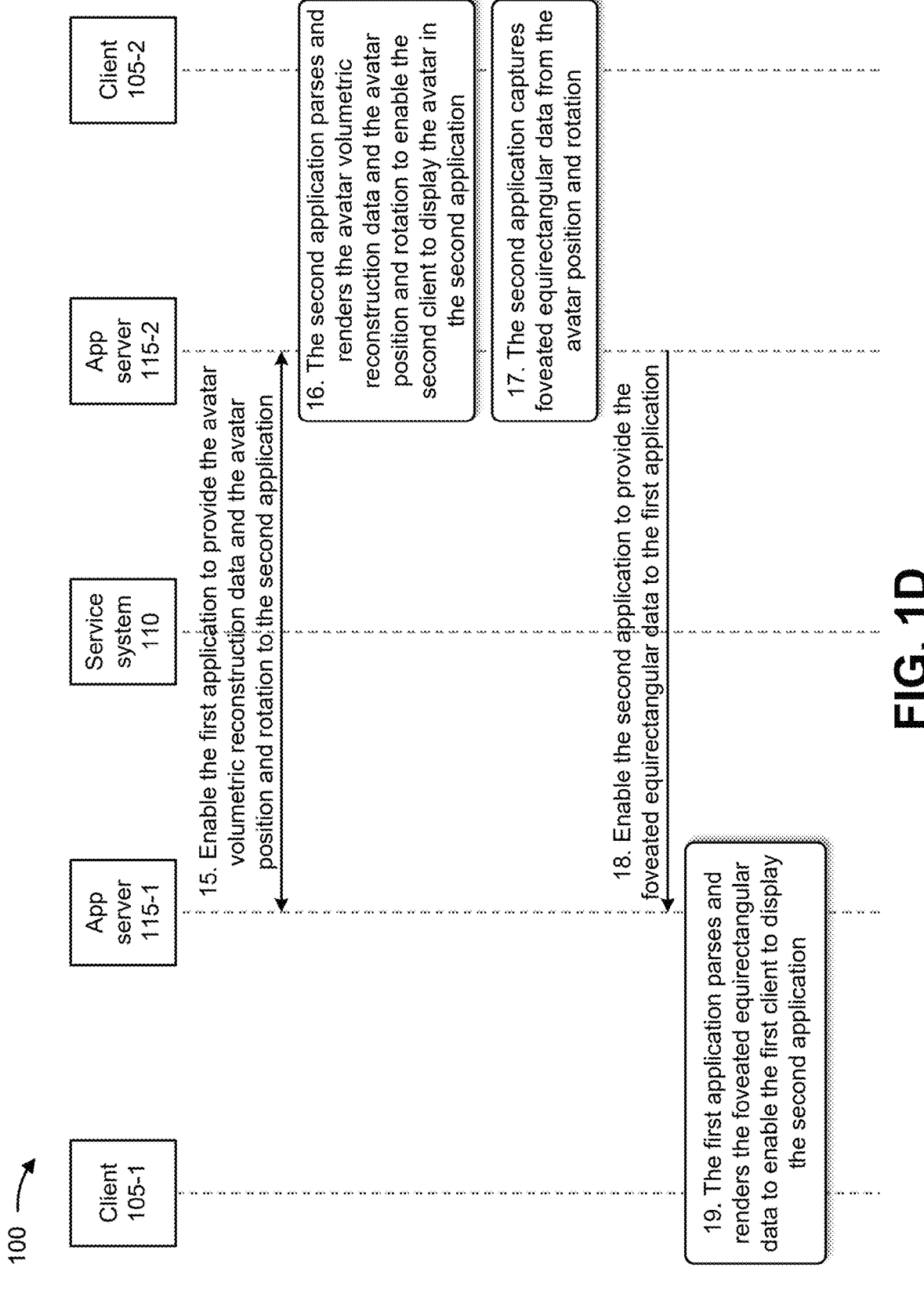

FIGS. 1B-1D depict a call flow diagram associated with enabling an avatar from one application (e.g., the first application) to visit another application (e.g., the second application). As shown at step 1 of in FIG. 1B, the first client 105-1 may register a first identifier with the first application provided by the first application server 115-1. For example, the first user of the first client 105-1 may wish to register the first client 105-1 with the first application, and may cause the first client 105-1 to provide the first identifier (e.g., a telephone number, a username, a device name, a device identifier, and/or the like) associated with the first client 105-1 to the first application server 115-1. As shown at step 2, the service system 110 may authenticate the first application based on the first identifier. For example, the first application server 115-1 may provide, to the service system 110, the first identifier and a request to a authenticate the first application. The service system 110 may receive the request, and may authenticate the first application based on the first identifier. If the service system 110 fails to authenticate the first application then the first client 105-1 will be unable to render an avatar in the second application.

As shown at step 3, the second client 105-2 may register a second identifier with the second application provided by the second application server 115-2. The second user of the second client 105-2 may wish to register the second client 105-2 with the second application, and may cause the second client 105-s to provide the second identifier (e.g., a telephone number, a username, a device name, a device identifier, and/or the like) associated with the second client 105-2 to the second application server 115-2. As shown at step 4, the service system 110 may authenticate the second application based on the second identifier. For example, the second application server 115-2 may provide, to the service system 110, the second identifier and a request to a authenticate the second application. The service system 110 may receive the request, and may authenticate the second application based on the second identifier. If the service system 110 fails to authenticate the second application then the second client 105-2 will be unable to view the avatar in the second application.

As shown at step 5, the first client 105-1 may initiate a communication with the second client 105-2 via the first application. For example, once the service system 110 authenticates the first application based on the first identifier, the first user may cause the first client 105-1 to generate the communication with the second client 105-2 via the first application. As shown at step 6, the service system 110 may receive the communication from the first application. For example, the first application server 115-1 may provide the communication to the service system 110 via the first application, and the service system 110 may receive the communication from the first application server 115-1 (e.g., via the first application). As shown at step 7, the service system 110 may provide the communication to the second application provided by the second application server 115-2. For example, the service system 110 may analyze data associated with the communication and may identify the second client 105-2 (e.g., the second user) and the second application server 115-2 based on the analysis. The service system 110 may provide the communication to the second application server 115-2 (e.g., to the second application)

based on identifying the second application server 115-2. The second application server 115-2 may display an incoming communication notification to the second client 105-2 via the second application based on receiving the communication from the service system 110.

As shown at step 8, the service system 110 may enable the communication to be answered by the second client 105-2 via the second application. For example, based on the incoming communication notification, the second user may utilize the second client 105-2 to answer the communication via the second application. As shown at step 9, the service system 110 may establish a data (e.g., including audio data) channel for the communication. For example, once the second client 105-2 answers the communication via the second application, the service system 110 may establish a data channel for communication provided between the first application server 115-1 and the second application server 115-2. In some implementations, the first application server 115-1 and the second application server 115-2 may utilize the data channel to exchange audio data and other described elsewhere herein.

In some implementations, the first application may determine whether accessing the second application is appropriate (e.g., based on whether the first application is aware of the second application), and may request access to the second application based on determining that accessing the second application is appropriate.

As shown at step 10 of FIG. 1C, the first client 105-1 may provide a request to grant access to the second application as an avatar. For example, the first user may cause the first client 105-1 to generate the request to grant access to the second application as the avatar. The first client 105-1 may provide the request to grant access to the second application as the avatar to the first application server 115-1, and the first application server 115-1 may receive the request to grant access to the second application as the avatar. As shown at step 11, the first application server 115-1 may provide the request to the second application via the data channel. For example, once the first application server 115-1 receives the request to grant access to the second application as the avatar, the first application server 115-1 may provide the request to the second application server 115-2 (e.g., to the second application) via the data channel. The second application server 115-2 may display the request to the second client 105-2 via the second application.

As shown at step 12, the service system 110 may enable the request to be accepted by the second client 105-2 via the second application. For example, the second user may cause the second client 105-2 to accept the request to grant access to the second application as the avatar via the second application, and the service system 110 may enable the request to be accepted by the second client 105-2 via the second application. As shown at step 13, the service system 110 may enable the first application and the second application to perform checks to determine a bit rate and a resolution of avatar volumetric reconstruction data and foveated equirectangular view data. For example, the service system 110 may enable the first application and the second application to perform checks, such as a connection limit check for the data channel, a resolution check for the data channel, a bandwidth check for the data channel, and/or the like. The checks may enable the first application and the second application to determine the bit rate and the resolution of the avatar volumetric reconstruction data (e.g., for rendering the avatar in the second application) and the foveated equirectangular view data (e.g., data for rendering the second application at the first client 105-1). As shown at step 14, the first application may capture the avatar volumetric reconstruction data and the avatar position and rotation via the first client 105-1. For example, the first application may capture, via the first client 105-1, an array of pixels to create depth images associated with the avatar. The first application may add the depth images together to generate an array of depth images that are utilized to build frames for the avatar volumetric reconstruction data. The first application may also capture, via the first client 105-1, the avatar position and rotation.

As shown at step 15 of FIG. 1D, the service system 110 may enable the first application to provide the avatar volumetric reconstruction data and the avatar position and rotation to the second application. For example, the first application server 115-1 and the second application server 115-2 may utilize the data channel created by the service system 110 to enable the first application to provide the avatar volumetric reconstruction data and the avatar position and rotation to the second application. As shown at step 16, the second application may parse and render the avatar volumetric reconstruction data and the avatar position and rotation to enable the second client 105-2 to display the avatar in the second application. For example, the second application (e.g., the second application server 115-2) may receive the avatar volumetric reconstruction data and the avatar position and rotation, and may parse and render the avatar volumetric reconstruction data and the avatar position and rotation to enable the second client 105-2 to display the avatar in the second application. In some implementations, the second application server 115-2 may parse the avatar volumetric reconstruction data to generate pixels and may render each pixel with a matrix transform based on the avatar position and rotation. Each pixel may be projected into the matrix transform with a color defined by red, green, or blue (RGB) and with a position defined by a position in the array of depth images. This data may be utilized to render the avatar as a point cloud or a polygonal mesh. The second application server 115-2 may determine how to render the avatar (e.g., as a point cloud or a polygonal mesh) based on constraints of rendering associated with the second application server 115-2.

As shown at step 17, the second application may capture foveated equirectangular data from the avatar position and rotation. For example, the second application may utilize the avatar position and rotation to capture the foveated equirectangular data associated with the second application. If the second application is a virtual reality application, the second application may capture two foveated equirectangular views that are spaced apart based on an interpupillary distance (e.g., to ensure an accurate render of the foveated equirectangular data associated with the second application). As shown at step 18, the service system 110 may enable the second application to provide the foveated equirectangular data to the first application. For example, the first application server 115-1 and the second application server 115-2 may utilize the data channel created by the service system 110 to enable the second application to provide the foveated equirectangular data to the first application. As shown at step 19, the first application may parse and render the foveated equirectangular data to enable the first client 105-2 to display the second application. For example, the first application (e.g., the first application server 115-1) may receive the foveated equirectangular data, and may parse and render the foveated equirectangular data to enable the first client 105-1 to display the second application to the first user. In some implementations, the foveated equirectangular data may enable the first client 105-1 to display the second application around the avatar.

In some implementations, the avatar may interact with objects in a visited application. For example, the visiting avatar, instead of being ghost-like (e.g., a body passing through objects in the visited application), may interact with objects within the visited application. The originating application may send synchronization events for each interaction point (e.g., hands may be interaction points as well as other interaction points selected by a developer) as the interaction point moves through space (e.g., in the form of geometric translations). The visited application may provide events back to the originating application to confirm interaction and to return metadata about an interaction with an object. These events may be provided via the established data channel to inform the other application about events that occurred, such as movement of an interaction point (rotationally or positionally) or that an object was interacted with by an interaction point. Both the originating and visited applications may receive and handle synchronization commands appropriately to create an interaction between the two separate applications.

In some implementations, the data channel may enable transmission of digital media (e.g., audio data, video data, three-dimensional objects, text, and/or the like). Given that there are two distinct development frameworks, an exchange configuration may be agreed upon in a calibration stage. Both applications may set accepted formats in which data is packaged. During the calibration stage, the accepted format configurations may be shared and a negotiation process may occur to identify the best formats for sharing each type of supported media between the two applications.

In one example, two users in separate experiences may initiate a connection between their two applications to initiate an avatar visiting session, where the avatar from the first application is able to enter the other user's application. The first application may identify the avatar's hands as a designated interaction point. There may be "grab" and "release" commands (e.g., selected from a set of commands that the two applications may share) that the avatar user from the first application can trigger by interacting with a control interface. The avatar, while visiting the other application, may grab a three-dimensional object from the second application (e.g., a coconut), and may decide to pull the coconut back to their application. Depending on how such an interaction is handled in the second application, the coconut may either be copied (e.g., to avoid data loss) or removed. The user from the first application may initiate a "transmit object" command (e.g., triggering such a command may be executed in a variety of ways), and the first application may reference an exchange format for a particular media type (e.g., a three-dimensional object, but may be video, audio, text, and/or the like). If a compatible exchange format is identified for the media type, the object may be sent to the first application over the data channel. When the user is back in the first application the user may see the coconut in natively rendered space.

In this way, the service system 110 enables an avatar from an application to visit another application. For example, the service system 110 may enable a user-controlled avatar (or player character) of one application to visit another application experience. The service system 110 may connect the two applications via a client identifier (e.g., a user's telephone number). The service system 110 may enable two users in different applications to visit each other in their native avatar form. The service system 110 may capture and render an avatar within another application and may not require specific avatar model formats by capturing the avatar's three-dimensional render, as opposed to capturing animation data then re-applying this data onto the same avatar in the other application. Thus, the service system 110 may conserve computing resources, networking resources, and/or other resources that would have otherwise been consumed by failing to provide an avatar from one application to another application without losing features of the avatar, failing to synchronize the same avatar in two different applications, providing a poor user experience associated with a user of the avatar, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
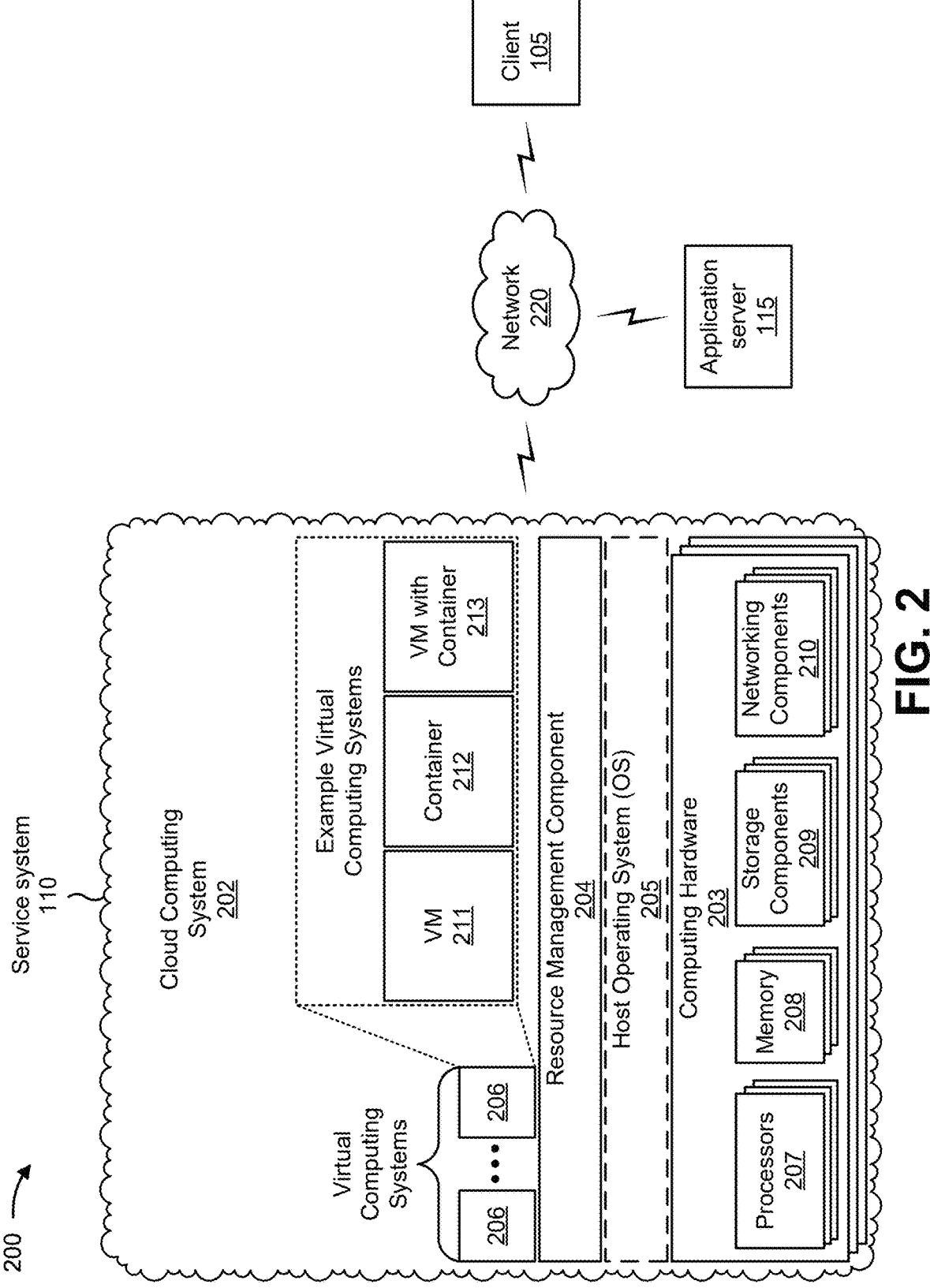
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the service system 110, which may include one or more elements of and/or may execute within a cloud computing system 202. The cloud computing system 202 may include one or more elements 203-213, as described in more detail below. As further shown in FIG. 2, the environment 200 may include the client 105, the application server 115, and/or a network 220. Devices and/or elements of the environment 200 may interconnect via wired connections and/or wireless connections.

The client 105 may include one or more devices capable of receiving, generating, storing, processing, and/or providing information, as described elsewhere herein. The client 105 may include a communication device and/or a computing device. For example, the client 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The application server 115 may include one or more devices capable of receiving, generating, storing, processing, providing, and/or routing information, as described elsewhere herein. The application server 115 may include a communication device and/or a computing device. For example, the application server 115 may include a server, such as an application server, a client server, a web server, a database server, a host server, a proxy server, a virtual server (e.g., executing on computing hardware), or a server in a cloud computing system. In some implementations, the application server 115 may include computing hardware used in a cloud computing environment.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the service system 110 may include one or more elements 203-213 of the cloud computing system 202, may execute within the cloud computing system 202, and/or may be hosted within the cloud computing system 202, in some implementations, the service system 110 may not be cloud-based (e.g., may be implemented outside of a cloud computing system) or may be partially cloud-based. For example, the service system 110 may include one or more devices that are not part of the cloud computing system 202, such as the device 300 of FIG. 3, which may include a standalone server or another type of computing device. The service system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
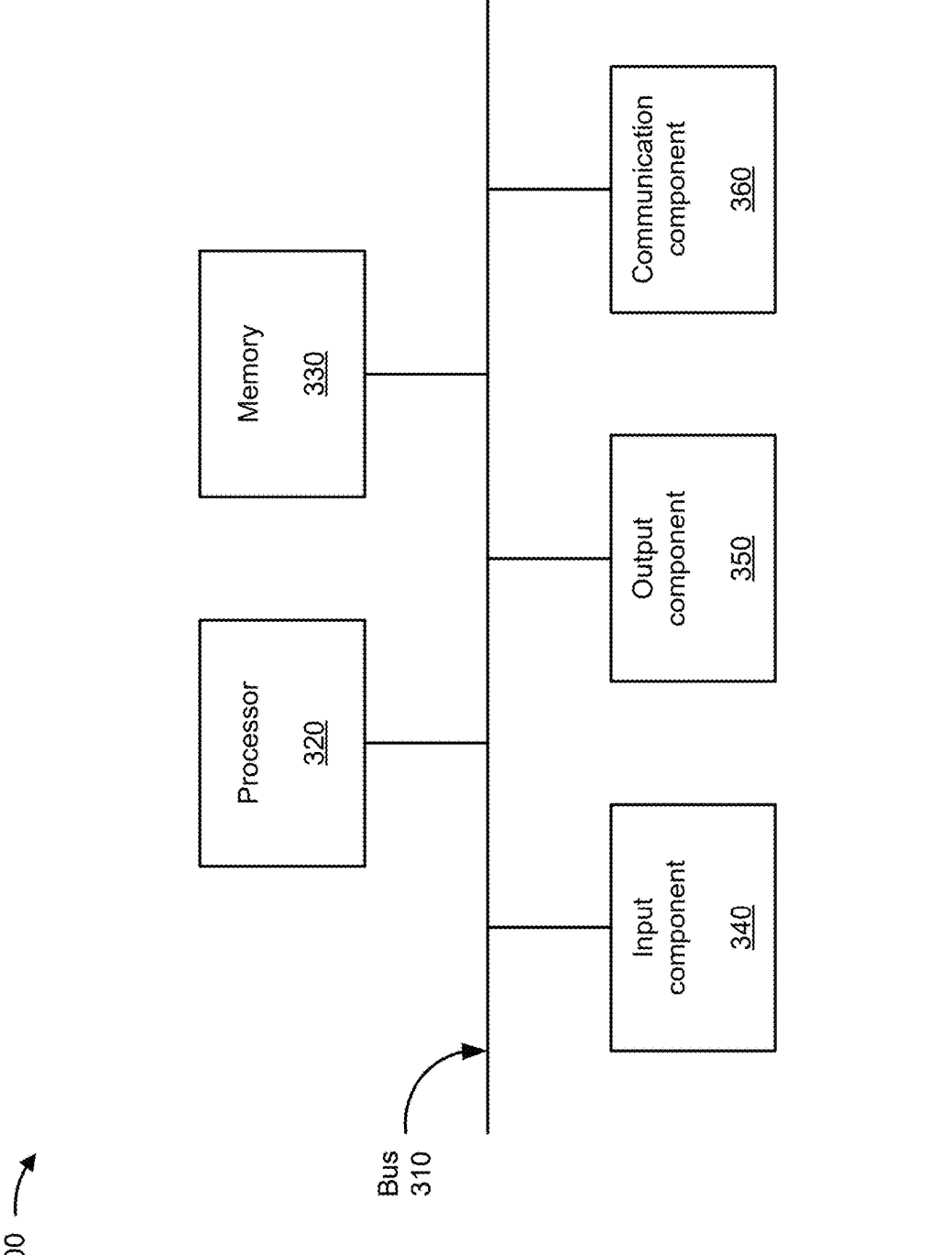
FIG. 3 is a diagram of example components of one or more devices of FIG. 2.

FIG. 3 is a diagram of example components of a device 300, which may correspond to the client 105, the service system 110, and/or the application server 115. In some implementations, the client 105, the service system 110, and/or the application server 115 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for enabling an avatar from an application to visit another application. In some implementations, one or more process blocks of FIG. 4 may be performed by a device (e.g., the service system 110). In some implementations, one or more process blocks of FIG. 4 may be performed by another device or a group of devices separate from or including the device, such as a client (e.g., the client 105), an application server (e.g., the application server 115), and/or the like. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include authenticating, based on a first identifier, a first application provided to a first client (block 405). For example, the device may authenticate, based on a first identifier, a first application provided to a first client, as described above. In some implementations, the device is a telephony Internet protocol network.

As further shown in FIG. 4, process 400 may include authenticating, based on a second identifier, a second application provided to a second client (block 410). For example, the device may authenticate, based on a second identifier, a second application provided to a second client, as described above. In some implementations, the first identifier is a first telephone number associated with the first client and the second identifier is a second telephone number associated with the second client. In some implementations, the first application is provided by a first application server associated with the first client and the second application is provided by a second application server associated with the second client. In some implementations, the second application is one of a video game application or a virtual meeting application.

As further shown in FIG. 4, process 400 may include receiving a communication initiated by the first client with the second client via the first application (block 415). For example, the device may receive a communication initiated by the first client with the second client via the first application, as described above.

As further shown in FIG. 4, process 400 may include providing the communication to the second application (block 420). For example, the device may provide the communication to the second application, as described above. In some implementations, the second application is configured to display the communication to the second client via an incoming communication notification.

As further shown in FIG. 4, process 400 may include enabling the communication to be answered by the second client via the second application (block 425). For example, the device may enable the communication to be answered by the second client via the second application, as described above.

As further shown in FIG. 4, process 400 may include establishing a data channel for the communication between the first application and the second application (block 430). For example, the device may establish a data channel for the communication between the first application and the second application, as described above.

As further shown in FIG. 4, process 400 may include enabling a request to grant access to the second application as an avatar to be provided to the second application via the data channel (block 435). For example, the device may enable a request to grant access to the second application as an avatar to be provided to the second application via the data channel, as described above. In some implementations, the second application is configured to display, to the second client, the request to grant access to the second application as the avatar. In some implementations, the avatar is an array of depth images captured by the first client.

As further shown in FIG. 4, process 400 may include enabling the request to be accepted by the second client via the second application (block 440). For example, the device may enable the request to be accepted by the second client via the second application, as described above.

As further shown in FIG. 4, process 400 may include enabling the first application and the second application to perform checks to determine a bit rate and a resolution of avatar volumetric reconstruction data and foveated equirectangular view data (block 445). For example, the device may enable the first application and the second application to perform checks to determine a bit rate and a resolution of avatar volumetric reconstruction data and foveated equirectangular view data, as described above.

As further shown in FIG. 4, process 400 may include enabling the first application to provide the avatar volumetric reconstruction data and the avatar position and rotation to the second application (block 450). For example, the device may enable the first application to provide the avatar volumetric reconstruction data and the avatar position and rotation to the second application, as described above. In some implementations, the first application is configured to capture the avatar volumetric reconstruction data and the avatar position and rotation via the first client. In some implementations, the second application is configured to parse and render the avatar volumetric reconstruction data and the avatar position and rotation to enable the second client to display the avatar in the second application.

As further shown in FIG. 4, process 400 may include enabling the second application to provide the foveated equirectangular data to the first application (block 455). For example, the device may enable the second application to provide the foveated equirectangular data to the first application, as described above. In some implementations, the second application is configured to capture the foveated equirectangular data from the avatar position and rotation. In some implementations, the first application is configured to parse and render the foveated equirectangular data to enable the first client to display the second application. In some implementations, the foveated equirectangular data enables the first client to display the second application around the avatar.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
authenticating, by a device and based on a first identifier, a first application provided to a first client;
authenticating, by the device and based on a second identifier, a second application provided to a second client;
receiving, by the device, a communication initiated by the first client with the second client via the first application;
providing, by the device, the communication to the second application;
enabling, by the device, the communication to be answered by the second client via the second application;
establishing, by the device, a data channel for the communication between the first application and the second application;
enabling, by the device, a request to grant access to the second application as an avatar to be provided to the second application via the data channel;
enabling, by the device, the request to be accepted by the second client via the second application;
enabling, by the device, the first application and the second application to perform checks to determine a bit rate and a resolution of avatar volumetric reconstruction data and foveated equirectangular view data;
enabling, by the device, the first application to provide the avatar volumetric reconstruction data and an avatar position and rotation to the second application; and
enabling, by the device, the second application to provide the foveated equirectangular data to the first application, wherein the second application is configured to parse and render the avatar volumetric reconstruction data and the avatar position and rotation to enable the second client to display the avatar in the second application.

2. The method of claim 1, wherein the second application is configured to display the communication to the second client via an incoming communication notification.

3. The method of claim 1, wherein the second application is configured to display, to the second client, the request to grant access to the second application as the avatar.

4. The method of claim 1, wherein the first application is configured to capture the avatar volumetric reconstruction data and the avatar position and rotation via the first client.

5. The method of claim 1, wherein the second application is configured to capture the foveated equirectangular data from the avatar position and rotation.

6. The method of claim 1, wherein the first application is configured to parse and render the foveated equirectangular data to enable the first client to display the second application.

7. The method of claim 1, wherein the avatar is an array of depth images captured by the first client.

8. The method of claim 1, wherein the first identifier is a first telephone number associated with the first client and the second identifier is a second telephone number associated with the second client.

9. A device, comprising:
one or more processors configured to:
authenticate, based on a first identifier, a first application provided to a first client;
authenticate, based on a second identifier, a second application provided to a second client;
receive a communication initiated by the first client with the second client via the first application;
provide the communication to the second application;
enable the communication to be answered by the second client via the second application;
establish a data channel for the communication between the first application and the second application;
enable a request to grant access to the second application as an avatar to be provided to the second application via the data channel;
enable the request to be accepted by the second client via the second application;
enable the first application and the second application to perform checks to determine a bit rate and a resolution of avatar volumetric reconstruction data and foveated equirectangular view data;
enable the first application to provide the avatar volumetric reconstruction data and an avatar position and rotation to the second application,
wherein the second application is configured to parse and render the avatar volumetric reconstruction data and the avatar position and rotation to enable the second client to display the avatar in the second application; and
enable the second application to provide the foveated equirectangular data to the first application.

10. The device of claim 9, wherein the device is a telephony Internet protocol network.

11. The device of claim 9, wherein the avatar is an array of depth images captured by the first client.

12. The device of claim 9, wherein the foveated equirectangular data enables the first client to display the second application around the avatar.

13. The device of claim 9, wherein the first identifier is a first telephone number associated with the first client and the second identifier is a second telephone number associated with the second client.

14. The device of claim 9, wherein the first application is provided by a first application server associated with the first client and the second application is provided by a second application server associated with the second client.

15. The device of claim 8, wherein the second application is one of a video game application or a virtual meeting application.

16. A non-transitory computer-readable medium storing a set of instructions, the set of instructions comprising:

one or more instructions that, when executed by one or more processors of a device, cause the device to:

authenticate, based on a first identifier, a first application provided to a first client;

authenticate, based on a second identifier, a second application provided to a second client;

receive a communication initiated by the first client with the second client via the first application;

provide the communication to the second application;

enable the communication to be answered by the second client via the second application;

establish a data channel for the communication between the first application and the second application;

enable a request to grant access to the second application as an avatar to be provided to the second application via the data channel;

enable the request to be accepted by the second client via the second application;

enable the first application and the second application to perform checks to determine a bit rate and a resolution of avatar volumetric reconstruction data and foveated equirectangular view data;

enable the first application to provide the avatar volumetric reconstruction data and an avatar position and rotation to the second application, wherein the first application is configured to capture the avatar volumetric reconstruction data and the avatar position and rotation via the first client; and enable the second application to provide the foveated equirectangular data to the first application, wherein the second application is configured to parse and render the avatar volumetric reconstruction data and the avatar position and rotation to enable the second client to display the avatar in the second application.

17. The non-transitory computer-readable medium of claim 16, wherein the second application is configured to capture the foveated equirectangular data from the avatar position and rotation.

18. The non-transitory computer-readable medium of claim 16, wherein the first application is configured to parse and render the foveated equirectangular data to enable the first client to display the second application.

19. The non-transitory computer-readable medium of claim 16, wherein the avatar is an array of depth images captured by the first client.

20. The non-transitory computer-readable medium of claim 16, wherein the first identifier is a first telephone number associated with the first client and the second identifier is a second telephone number associated with the second client.

\* \* \* \* \*